United States Patent
Yu et al.

(10) Patent No.: US 12,234,153 B2
(45) Date of Patent: Feb. 25, 2025

(54) METHOD FOR PREPARING GRAPHENE-BASED SODIUM ION BATTERY NEGATIVE ELECTRODE MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/558,181

(22) PCT Filed: Jul. 28, 2022

(86) PCT No.: PCT/CN2022/108657
§ 371 (c)(1),
(2) Date: Oct. 30, 2023

(87) PCT Pub. No.: WO2023/071337
PCT Pub. Date: May 4, 2023

(65) Prior Publication Data
US 2024/0327223 A1    Oct. 3, 2024

(30) Foreign Application Priority Data

Oct. 28, 2021 (CN) .......................... 202111259960.6

(51) Int. Cl.
| | | |
|---|---|---|
| *C01B 32/198* | (2017.01) | |
| *C01G 51/04* | (2006.01) | |
| *H01M 10/054* | (2010.01) | |

(52) U.S. Cl.
CPC ............ *C01B 32/198* (2017.08); *C01G 51/04* (2013.01); *C01P 2002/01* (2013.01); *C01P 2004/04* (2013.01); *C01P 2006/40* (2013.01); *H01M 10/054* (2013.01)

(58) Field of Classification Search
CPC combination set(s) only.
See application file for complete search history.

(56) References Cited

U.S. PATENT DOCUMENTS

2017/0018783 A1  1/2017  Ichihara et al.
2017/0352869 A1  12/2017  Zhamu et al.

FOREIGN PATENT DOCUMENTS

CN   101800302 A   8/2010
CN   104319395 A   1/2015
(Continued)

OTHER PUBLICATIONS

International Search Report for PCT Application No. PCT/CN2022/108657 issued on Oct. 25, 2022, with English translation, 7 pgs.
(Continued)

*Primary Examiner* — Daniel S Gatewood
(74) *Attorney, Agent, or Firm* — Buchalter; Jason W. Croft

(57) ABSTRACT

Disclosed is a method for preparing a graphene-based sodium ion battery negative electrode material, including adding graphene oxide into ethanol absolute, carrying out ultrasonic treatment at a certain temperature to obtain a
(Continued)

graphene oxide alcohol dispersion, then preparing a sodium hexanitritocobaltate solution, adding the graphene oxide alcohol dispersion into the sodium hexanitritocobaltate solution, carrying out solid-liquid separation to obtain a solid, isolating the solid from oxygen for calcination, and washing and drying to obtain a graphene-based sodium ion battery negative electrode material.

9 Claims, 1 Drawing Sheet

(56) References Cited

FOREIGN PATENT DOCUMENTS

| CN | 104393283 A | * | 3/2015 | ............ B82Y 30/00 |
|---|---|---|---|---|
| CN | 105633382 A | | 6/2016 | |
| CN | 106564882 A | | 4/2017 | |
| CN | 107394178 A | | 11/2017 | |
| CN | 110429255 A | | 11/2019 | |
| CN | 111525127 A | | 8/2020 | |
| CN | 114229914 A | | 3/2022 | |

OTHER PUBLICATIONS

Written Opinion of the International Searching Authority for the PCT Application No. PCT/CN2022/108657 issued on Oct. 25, 2022, with English translation, 5 pgs.

First Search Report for Chinese Patent Application No. CN114229914A issued on Apr. 21, 2023 with English translation, 4 pgs.

Notification to Grant Patent Right for Invention in Chinese Application No. 202111259960.6 mailed Apr. 27, 2023, 3 pgs.

* cited by examiner

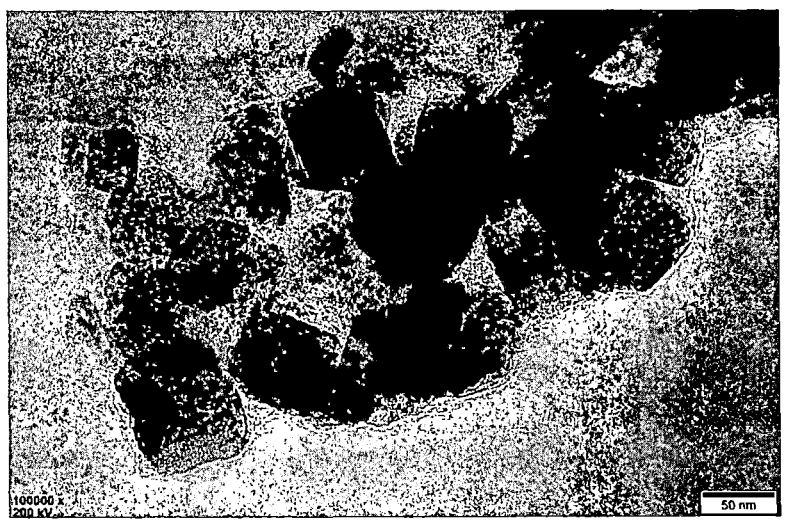

METHOD FOR PREPARING GRAPHENE-BASED SODIUM ION BATTERY NEGATIVE ELECTRODE MATERIAL

CROSS-REFERENCE TO RELATED APPLICATION

This application is a national stage filing under 35 U.S.C. § 371 of international application number PCT/CN2022/108657, filed Jul. 28, 2022, which claims priority to Chinese patent application No. 202111259960.6, filed Oct. 28, 2021. The contents of these applications are incorporated herein by reference in their entirety.

TECHNICAL FIELD

The present disclosure relates to the technical field of sodium-ion batteries and specifically relates to a preparation method of a graphene-based sodium-ion battery negative electrode material.

BACKGROUND

Sodium and lithium belong to a same main group and thus have many similar chemical properties. Lithium-ion batteries have been developed rapidly due to a characteristic of a high specific energy superior to sodium-ion batteries. Therefore, research on the sodium-ion batteries is rather slow. In recent years, with development of large-scale energy storage and electric automobiles, the sodium-ion batteries are receiving attention again due to characteristics of abundant raw materials and low cost, and become one of choices for replacing the lithium-ion batteries. A cathode material of the sodium-ion batteries achieves a great progress by referring research results of the lithium-ion batteries.

In electrochemical applications, graphene is currently and mainly used in supercapacitors and lithium-ion batteries. The traditional lithium-ion batteries usually use graphite as an anode material. However, the graphite has a relatively low theoretical specific capacity of 372 mAh/g and thus is no longer suitable for requirements of energy power and emerging electronic products. Therefore, graphene has been studied extensively as a most potential carbon source material. Compared with the traditional graphite, the graphene has a perfect two-dimensional structure and thus has a larger specific surface area, such that lithium ions can be more easily intercalated and deintercalated and higher capacity (theoretical capacity of 740-780 mAh/g) and energy density of the lithium-ion batteries are ensured. In addition, due to relatively high conductivity of the graphene and a relatively short diffusion path of the lithium ions, a rate performance of the batteries is improved to a certain extent.

The graphite has an excellent cycle performance and a relatively high specific capacity as a lithium-ion battery negative electrode material, but only has a specific capacity of 35 mAh/g as a sodium-ion battery negative electrode material, and thus cannot be used as a sodium-ion battery negative electrode.

The sodium-ion battery negative electrode material is used as a sodium storage main body of the sodium-ion batteries and the sodium ions are intercalated/deintercalated during charge and discharge. Therefore, a choice of an anode material plays a decisive role in development of the sodium-ion batteries.

As lithium ion-like batteries, the sodium-ion batteries have many similarities with the lithium-ion batteries, thus the sodium-ion batteries have many references in choosing the anode material. However, since sodium ions have a larger radius (0.102 nm) than lithium ions (0.069 nm), a graphite material as a commercialized anode material for the lithium-ion batteries is not suitable as a sodium-ion battery negative electrode material, while a carbon material with a larger interlayer distance can become a new choice for the sodium-ion battery negative electrode material.

Currently, due to higher cycle stability, more attention are paid on sodium storage anode materials, mainly including hard carbon, $Na_2Ti_3O_7$, $Li_4Ti5O_{12}$ and the like. In the sodium storage anode materials, the $Na_2Ti_3O_7$ and the $Li_4Ti5O_{12}$ usually have a specific capacity of less than 200 mAh/g, and thus are difficult to meet requirements of large-capacity energy storage batteries. Although, the hard carbon has a sodium storage capacity of 300 mAh/g, the hard carbon has a poor rate performance. Besides, most of the capacity is realized in a region with a discharge voltage lower than 0.1 V (vs. $Na/Na^+$), and the potential is very close to a precipitation potential of metal sodium, which may cause formation of sodium dendrites on a surface of an electrode and bring about serious safety hazards. Therefore, it is of great significance in searching for a novel sodium-ion battery negative electrode material with a high specific capacity, a better rate performance, cycle stability and high safety.

SUMMARY

The present disclosure is intended to solve at least one of the technical problems above existing in the prior art. For this reason, the present disclosure provides a preparation method of a graphene-based sodium-ion battery negative electrode material.

According to one aspect of the present disclosure, a preparation method of a graphene-based sodium-ion battery negative electrode material includes the following steps:
  adding graphene oxide into anhydrous ethanol and conducting ultrasonic treatment at a certain temperature to obtain a graphene oxide ethanol dispersion solution;
  dissolving cobalt nitrate and sodium nitrite with water to obtain a solution A;
  adding acetic acid to the solution A, adding hydrogen peroxide to react, and carrying out a solid-liquid separation after a reaction to obtain a solution B; and
  adding the graphene oxide ethanol dispersion solution into the solution B, conducting a solid-liquid separation to obtain a solid, calcining the solid under oxygen isolation, and washing and drying the solid to obtain the graphene-based sodium-ion battery negative electrode material. The material is composed of cobalt monoxide and nitrogen-doped graphene oxide, where the graphene oxide has a mass fraction of 30-90% and the rest is the cobalt monoxide.

In some embodiments of the present disclosure, the ultrasonic treatment is conducted at 30-60° C. for 30-240 min.

In some embodiments of the present disclosure, the anhydrous ethanol and the graphene oxide have a liquid-solid ratio of 1 mL:(0.05-0.2) g.

In some embodiments of the present disclosure, in the solution A, a cobalt ion has a concentration of 1-2 mol/L and the sodium nitrite has a concentration of 8-12 mol/L.

In some embodiments of the present disclosure, the acetic acid has a mass concentration of 50-60% and the acetic acid and the solution A have a volume ratio of (1-2):5.

In some embodiments of the present disclosure, the hydrogen peroxide has a mass concentration of 25-35% and the hydrogen peroxide and the solution A have a volume ratio of (1-2):5.

In some embodiments of the present disclosure, before the calcination, the solid is further washed with the anhydrous ethanol. Preferably, the washing may be conducted 2-5 times.

In some embodiments of the present disclosure, the graphene oxide ethanol dispersion solution and the solution B have a volume ratio of (1.5-4):1.

In some embodiments of the present disclosure, the calcination is conducted at 500-800° C. for 2-8 h.

In the present disclosure, the solid-liquid separation is conducted in a centrifugation manner. Under the centrifugal separation, the sodium hexanitrocobaltate and the graphene oxide are uniformly mixed, which is beneficial to a next step of calcination.

In some embodiments of the present disclosure, after the calcination, the solid is further washed with ethanol at a mass fraction ≥95% to remove a useless sodium ion.

A preferred embodiment of the present disclosure at least has the following beneficial effects:

1. Graphene oxide is dispersed in anhydrous ethanol to prepare a graphene oxide ethanol dispersion solution, sodium hexanitrocobaltate is prepared by synthetic reaction, the sodium hexanitrocobaltate is subjected to alcohol precipitation through the graphene oxide ethanol dispersion solution and a target product is prepared by a next step of calcination; and a reaction equation for preparing the sodium hexanitrocobaltate is as follows:

$$24NaNO_2+4Co(NO_3)_2+4HAc+2H_2O_2=4Na_3[Co(NO_2)_6]+8NaNO_3+4NaAc+4H_2O.$$

2. Since the sodium hexanitrocobaltate contains a large amount of nitro groups, the graphene oxide is doped with nitrogen through the sodium hexanitrocobaltate; and cobalt in the sodium hexanitrocobaltate is a trivalent ion, has a strong oxidizing property, and further improves efficiency of nitrogen doping, thereby enlarging a distance between graphene oxide layers and facilitating deintercalation of sodium ions.

3. After the calcination, cobalt was uniformly dispersed on a surface of the graphene oxide in a form of cobalt monoxide, thus breakage of the graphene oxide during charge and discharge was effectively inhibited.

4. The graphene oxide is doped with nitrogen through the calcination, cobalt monoxide is also mixed, and thus a specific capacity and a cycle performance of the material are improved.

BRIEF DESCRIPTION OF DRAWINGS

The present disclosure is further described below with reference to accompanying drawings and embodiments, in which:

FIG. 1 is a transmission electron microscopy (TEM) image of the graphene-based sodium-ion battery negative electrode material prepared by Embodiment 2 of the present disclosure.

DETAILED DESCRIPTION

The concepts and technical effects of the present disclosure are clearly and completely described below in conjunction with embodiments, so as to allow the objectives, features and effects of the present disclosure to be fully understood. Apparently, the described embodiments are merely some rather than all of the embodiments of the present disclosure. All other embodiments obtained by those skilled in the art based on the embodiments of the present disclosure without creative efforts should fall within the protection scope of the present disclosure.

Embodiment 1

A graphene-based sodium-ion battery negative electrode material was prepared by the embodiment and specifically included the following steps:

(1) 5 g of graphene oxide was added into 100 mL of anhydrous ethanol and ultrasonic treatment was conducted at a constant temperature of 30° C. for 30 min to obtain a graphene oxide ethanol dispersion solution;

(2) 50 mL of a solution A containing 1 mol/L of cobalt nitrate and 8 mol/L of sodium nitrite was prepared;

(3) 10 mL of acetic acid with a mass concentration of 50% was slowly added into the solution A under constant stirring, 10 mL of hydrogen peroxide with a mass concentration of 30% was added, and after reaction, a solid-liquid separation was conducted to remove possible precipitated salt impurities to obtain a solution B;

(4) after the graphene oxide ethanol dispersion solution in step (1) was added to the solution B, a centrifugal separation was conducted to obtain a solid and the solid was washed 2-5 times with anhydrous ethanol; and (5) the washed solid was calcined at 500° C. under oxygen isolation for 8 h, after cooling, the solid was washed with 95% ethanol for 2-5 times, and the solid was dried to obtain the graphene-based sodium-ion battery negative electrode material.

After testing, the graphene-based sodium-ion battery negative electrode material has a total mass of 9.37 g, where cobalt monoxide is 3.16 g.

Embodiment 2

A graphene-based sodium-ion battery negative electrode material was prepared by the embodiment and specifically included the following steps:

(1) 10 g of graphene oxide was added into 120 mL of anhydrous ethanol and ultrasonic treatment was conducted at a constant temperature of 45° C. for 120 min to obtain a graphene oxide ethanol dispersion solution;

(2) 50 mL of a solution A containing 1.2 mol/L of cobalt nitrate and 10 mol/L of sodium nitrite was prepared;

(3) 15 mL of acetic acid with a mass concentration of 50% was slowly added into the solution A under constant stirring, 15 mL of hydrogen peroxide with a mass concentration of 30% was added, and after reaction, a solid-liquid separation was conducted to remove possible precipitated salt impurities to obtain a solution B;

(4) after the graphene oxide ethanol dispersion solution in step (1) was added to the solution B, a centrifugal separation was conducted to obtain a solid and the solid was washed 2-5 times with anhydrous ethanol; and (5) the washed solid was calcined at 600° C. under oxygen isolation for 5 h, after cooling, the solid was washed with 95% ethanol for 2-5 times, and the solid was dried to obtain the graphene-based sodium-ion battery negative electrode material.

After testing, the graphene-based sodium-ion battery negative electrode material has a total mass of 15.42 g, where cobalt monoxide is 3.66 g.

Embodiment 3

A graphene-based sodium-ion battery negative electrode material was prepared by the embodiment and specifically included the following steps:
(1) 20 g of graphene oxide was added into 200 mL of anhydrous ethanol and ultrasonic treatment was conducted at a constant temperature of 30° C. for 100 min to obtain a graphene oxide ethanol dispersion solution;
(2) 50 mL of a solution A containing 2 mol/L of cobalt nitrate and 12 mol/L of sodium nitrite was prepared;
(3) 20 mL of acetic acid with a mass concentration of 50% was slowly added into the solution A under constant stirring, 20 mL of hydrogen peroxide with a mass concentration of 30% was added, and after reaction, a solid-liquid separation was conducted to remove possible precipitated salt impurities to obtain a solution B;
(4) after the graphene oxide ethanol dispersion solution in step (1) was added to the solution B, a centrifugal separation was conducted to obtain a solid and the solid was washed 2-5 times with anhydrous ethanol; and
(5) the washed solid was calcined at 800° C. under oxygen isolation for 2 h, after cooling, the solid was washed with 95% ethanol for 2-5 times, and the solid was dried to obtain the graphene-based sodium-ion battery negative electrode material.

After testing, the graphene-based sodium-ion battery negative electrode material has a total mass of 28.76 g, where cobalt monoxide is 6.33 g.

Test Embodiment

The sodium-ion battery negative electrode material prepared in Embodiments 1-3 and unmodified graphene oxide were respectively prepared into sodium-ion battery negative electrode pieces, the sodium-ion battery negative electrode pieces were assembled into button batteries, and the button batteries were tested at a current density of 100 mA/g and a voltage range of 0.001-2.0 V. Results were shown in Table 1.

TABLE 1

Test results of performance of graphene-based sodium-ion battery negative electrode material

|  | Gram capacity of first charge and discharge (mAh/g) | Gram capacity after 50 times of charge and discharge (mAh/g) |
|---|---|---|
| Embodiment 1 | 632.7 | 628.3 |
| Embodiment 2 | 642.4 | 640.3 |
| Embodiment 3 | 613.3 | 607.6 |
| Unmodified graphene oxide | 352.9 | 177.32 |

It can be seen from Table 1 that compared with the unmodified graphene oxide, the sodium-ion battery negative electrode material of Embodiments 1-3 had a significantly higher specific capacity and cycle performance. Since the graphene oxide was doped with nitrogen, a distance between graphene oxide layers was enlarged, deintercalation of sodium ions was facilitated, the specific capacity was improved, at the same time, cobalt was uniformly dispersed on a surface of the graphene oxide in a form of cobalt monoxide, breakage of graphene oxide during charge and discharge was effectively inhibited, and the cycle performance was improved.

The embodiments of the present disclosure are described in detail above with reference to the accompanying drawings. However, the present disclosure is not limited to the above-mentioned embodiments. Within the scope of knowledge possessed by a person of ordinary skill in the art, various modifications can be made without departing from a purpose of the present disclosure. In addition, the embodiments in the present disclosure and features in the embodiments may be combined with each other in a non-conflicting situation.

The invention claimed is:

1. A preparation method for a graphene-based anode material for sodium-ion batteries comprising the following steps:
   adding graphene oxide into anhydrous ethanol and conducting ultrasonic treatment at 30° C. to 60° C. to obtain a graphene oxide ethanol dispersion solution;
   dissolving cobalt nitrate and sodium nitrite with water to obtain a solution A;
   adding acetic acid to the solution A, adding hydrogen peroxide for an oxidation reaction of the cobalt nitrate, and performing solid-liquid separation on a material after the oxidation reaction of the cobalt nitrate to obtain a solution B of sodium hexanitrocobaltate; and
   adding the graphene oxide ethanol dispersion solution into the solution B of sodium hexanitrocobaltate, performing solid-liquid separation on a reacted material to obtain a solid, calcining the solid under oxygen isolation at a temperature of 500° C. to 800° C. for 2-8 h, and washing and drying a solid after the calcining to obtain the graphene-based anode material for sodium-ion batteries;
   wherein the graphene-based anode material for sodium-ion batteries is composed of cobalt monoxide and nitrogen-doped graphene oxide, wherein the nitrogen-doped graphene oxide has a mass fraction of 30% to 90% and the rest is the cobalt monoxide.

2. The preparation method of claim 1, wherein the ultrasonic treatment is conducted for 30 to 240 min.

3. The preparation method of claim 1, wherein the anhydrous ethanol and the graphene oxide have a liquid-solid ratio of 1 mL:(0.05-0.2) g.

4. The preparation method of claim 1, wherein in the solution A, a concentration of cobalt ions is 1 to 2 mol/L, and a concentration of the sodium nitrite is 8 to 12 mol/L.

5. The preparation method of claim 1, wherein the acetic acid has a mass concentration of 50% to 60% and the acetic acid and the solution A have a volume ratio of (1-2):5.

6. The preparation method of claim 1, wherein the hydrogen peroxide has a mass concentration of 25% to 35% and the hydrogen peroxide and the solution A have a volume ratio of (1-2):5.

7. The preparation method of claim 1, wherein before the calcining, the solid is further washed with anhydrous ethanol.

8. The preparation method of claim 1, wherein the graphene oxide ethanol dispersion solution and the solution B have a volume ratio of (1.5-4):1.

9. The preparation method of claim 1, wherein the solid-liquid separation is conducted in a centrifugation manner.

* * * * *